Figure 1:
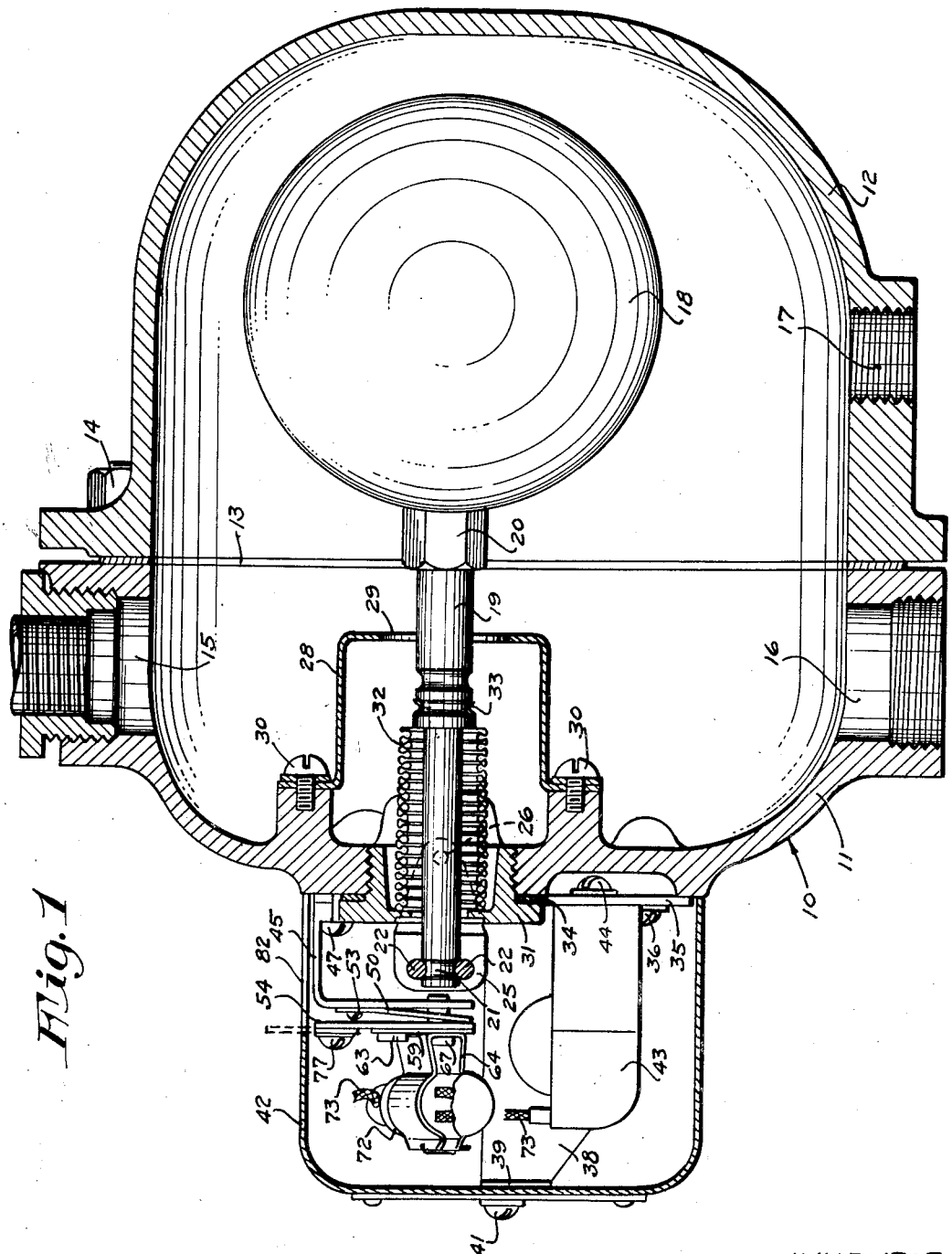

Jan. 24, 1939.  C. G. KRONMILLER  2,145,199
CONTROL MECHANISM
Filed Nov. 3, 1934   2 Sheets—Sheet 1

INVENTOR
Carl G. Kronmiller
BY HIS ATTORNEY
George H. Fisher

Jan. 24, 1939.  C. G. KRONMILLER  2,145,199
CONTROL MECHANISM
Filed Nov. 3, 1934  2 Sheets-Sheet 2
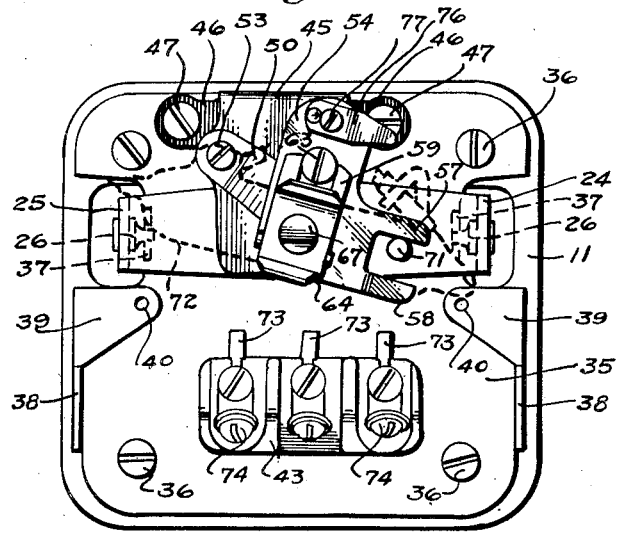
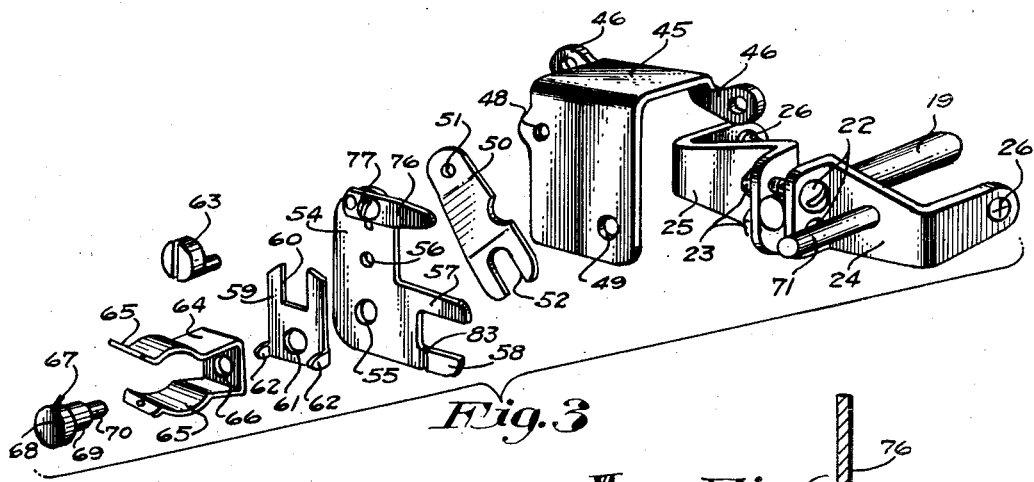
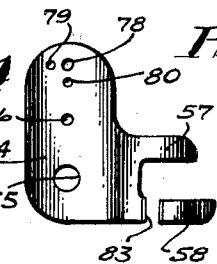
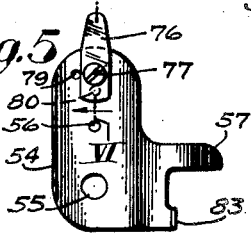
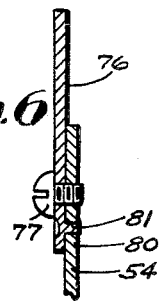
INVENTOR
Carl G. Kronmiller
BY HIS ATTORNEY
George H. Fisher Patented Jan. 24, 1939

2,145,199

UNITED STATES PATENT OFFICE 2,145,199

CONTROL MECHANISM

Carl G. Kronmiller, Minneapolis, Minn., assignor to Minneapolis-Honeywell Regulator Company, Minneapolis, Minn., a corporation of Delaware Application November 3, 1934, Serial No. 751,428

15 Claims. (Cl. 200—84)

This invention relates to control mechanisms in general and more specifically to liquid level controls for switches and is of particular utility in operating mercury switches.

An object of this invention is to provide a liquid level control mechanism embodying a lost motion so that surges in the float chamber are not transmitted to the control device or switch.

Another object of this invention is to provide a mechanism operating an element with a lost motion between the mechanism and the element and with a friction spring device interposed in the lost motion whereby the element is held in the positions produced by the mechanism.

A further object is to provide a control mechanism operating an element wherein the operation is automatically repeated or wherein it is semi-automatic requiring manual resetting.

A still further object is to provide a liquid level control mechanism wherein the float chamber is efficiently sealed and wherein the sealing means offers very little resistance to the movement of the float.

Other objects and advantages will become apparent to those skilled in the art by reference to the accompanying specification and drawings in which:

Fig. 1 is a vertical sectional view of the control mechanism,

Fig. 2 is a partial front elevational view looking from the left in Fig. 1 with the cover removed and the mercury tube switch being shown in dotted lines for clearness, Fig. 3 is an exploded perspective view of the parts forming a portion of the control mechanism, Fig. 4 is an elevational view of one of the elements, Fig. 5 is an elevational view of the same element adapted for a different mode of operation, Fig. 6 is an enlarged vertical sectional view taken about on the line VI—VI of Fig. 5.

Although the control mechanism of this invention is capable of use in different types of systems, it is preferably shown as a liquid level controlling mechanism wherein 10 designates generally the housing or float chamber which consists of a front portion 11 and a rear portion 12 having a gasket 13 interposed therebetween, these portions being secured together by nut and bolt arrangements 14. The front portion 11 of the float chamber 10 has an upper opening 15 and a lower opening 16 which openings receive pipe connections to be attached to a device whose liquid level is to control the instrument. Such connections, for example, may be made to the ends of a gauge glass of a boiler so that the water level of the boiler would be transmitted into the casing or float chamber 10. If the float chamber 10 is connected to a device having pressure, a pressure blow-off cock may be secured in an opening 17 formed in the rear portion 12 to prevent overstressing of the housing and breakage of the parts therein.

Located in the housing 10 is a float 18 which is raised or lowered according to the level of the liquid in the housing 10. This float 18 is secured to one end of a rod 19 by means of a nut 20. The other end of the rod 19 has a groove 21 therein to accommodate bolts 22 which rigidly secure oppositely extending arms 24 and 25 to the rod 19. The arms 24 and 25 are clamped against the rod 19 by drawing up the nuts 23 on the bolts 22. The ends of these arms 24 and 25 are provided with inwardly extending pivots 26 riveted thereto for pivotally supporting the float assembly.

Secured to the inner side of the housing 10 by means of screws 30 is a guard 28 in the form of a U-shaped strip having an opening 29 therein which serves as abutments to limit the upward and downward movement of the float 18.

A plug 31 is screw-threaded in the housing 10 and has secured thereto one end of a bellows 32 and the other end of the bellows 32 is secured to the rod 19 as at 33. A gasket 34 is interposed between the plug 31 and the housing 10, the gasket 34 and the bellows 32 forming an efficient seal for the float chamber 10.

Secured to the outer side of the housing 10 by means of screws 36 is a plate 35 which has rearwardly extended flanges 37 to receive the pivots 26 of the arms 24 and 25. It will be noted at this point that the arms 24 and 25 of the float assembly extend rearwardly and are pivoted at 26 to the rearwardly extending flanges 37 at a point intermediate the ends of the sealing bellows 32 as shown in Fig. 1. By this construction, a real benefit is obtained in that undue straining and stressing of the bellows 32 by upward and downward movement of the float 18 is eliminated by evenly distributing the stresses throughout the bellows 32 whereby resistance to the movement of the float 18 by the bellows 32 is substantially decreased.

The plate 35 also has forwardly extending flanges 38 which are provided with other flanges 39 having screw-threaded openings 40 therein. A cover 42 is secured to these flanges 39 by means of the screws 41 screw-threaded in the screw-threaded openings 40. A terminal block designated at 43 is secured to the plate 35 by means of screws 44.

45 designates a supporting member having ears 46 through which extend screws 47 for securing the supporting member 45 to the plate 35. Located in the supporting member 45 is a screw-threaded hole 48 and another hole 49.

50 designates a leaf spring having a hole 51, which lies adjacent to the hole 48 of the supporting member 45, and a slot 52 which lies adjacent to the hole 49 of the supporting member 45. The leaf spring 50 is secured to the supporting member 45 by means of a screw 53 extending through the hole 51 and screw-threaded in the screw-threaded hole 48 of the supporting member 45.

54 designates a lever in the form of a bell-crank having holes 55 and 56 therein and laterally extending and spaced projections 57 and 58.

A mercury switch clip supporting member is designated at 59 and has a slot 60, a hole 61 and upturned lugs 62. The slot 60 of the mercury switch clip supporting member 59 accommodates the head of an eccentric rivet 63 which rivet extends into the hole 56 of the lever 54 so that by turning the eccentric rivet, the mercury switch clip supporting member 59 may be adjusted relative to the lever 54.

64 designates a mercury switch clip having spring fingers 65, to hold a mercury tube switch 72, and a hole 66.

67 designates a rivet having a head 68, a shoulder 69 and an extension 70 which rivet is used to assemble the above parts to pivotally mount the same. The assembling of the parts is accomplished by extending the shoulder 69 of the rivet 67 through hole 66 of the mercury switch clip 64, hole 61 of the mercury switch clip supporting member 59, hole 55 of the lever 54 and slot 52 of the leaf spring 50 and extending the extension 70 of the rivet 67 into the hole 49 of the support 45 and riveting the end of this extension over to securely fasten the rivet 67 to the supporting member 45. In this manner, the mercury switch clip 64 and the mercury switch clip supporting member 59 and the lever 54 are pivotally mounted and the oscillations of these members are resisted by the leaf spring friction device 50.

71 designates a pin which extends forwardly from the pivoted arm 24 to project between the projections 57 and 58 and to engage these projections to oscillate the lever 54 in either direction.

The mercury switch clip 64 holds the mercury switch tube 72 which tube has conventional contacts that are made and broken by the mercury contained within the tube. These conventional contacts are connected by means of flexible lead wires 73 to binding posts 74 located on the terminal block 43.

The operation of the device as described thus far is as follows:

Assume the float 18 in its upper position, the pin 71 engages the projection 58 of the lever 54 to move the lever and the switch in a clockwise direction, thereby placing the switch in one of its circuit controlling positions. As the liquid level in the casing 10 lowers, the float 18 lowers about the pivots 26 and raises the pin 71. As the float approaches its limit of downward movement, pin 71 engages the lug 57 of the lever 54 to oscillate the lever 54 and mercury switch tube 72 carried thereby in a counter-clockwise direction until the lever 54 has moved sufficiently to allow the mercury to flow from the right side of the tube 72 to the left side of the tube 72, thereby placing the switch in another circuit controlling position.

As the level of the liquid in the float chamber 10 rises, the float 18 is lifted about its pivots 26 and the pin 71 abuts the lug 58 of the lever 54 to oscillate the lever 54 about its pivot 55 in a clockwise direction as the float 18 approaches its upper limit of movement. Clockwise movement continues until the tube 72 is so oscillated that the mercury contained therein will flow from the left side of the tube 72 to the right side to return the switch to its first circuit controlling position.

It will be noted at this point that as the pin 71 moves from one projection 57 to the other projection 58 and vice versa, the lever 54 is held in its pivoted positions by the leaf spring friction device 50 which prevents movement of the lever 54 and the tube 72 between these limits of movement of pin 71 which may be caused by surges of the liquid in the float chamber 10. In effect, the mercury switch 72 is urged from one position to the other and is not subject to vibrations of the float 18 as if it were directly connected thereto.

The above operation is entirely automatic and moves the switch from one position to the other according to changes of the level of the liquid in the float chamber 10.

At times, it may be desired to know when the liquid in the float chamber 10 has lowered sufficiently to perform one of the switching operations in the mercury switch tube 72 and under such circumstances, it may be advisable to provide a manual means for performing the other operation of the switch so that the control mechanism will not be completely automatic, as above, but semi-automatic in its effect.

In order to accomplish this, the lever 54 is provided with a screw-threaded hole 78 and two holes 79 and 80 angularly spaced apart by 90°. Cooperating with the lever 54 is a manual reset lever 76 having a screw 77 extended therethrough to be screw-threaded in the screw-threaded hole 78 of the lever 54. The manual reset lever 76 has a pin 81 thereon to engage in either hole 79 or 80. The cover 42 which encloses the mechanism of this invention has a portion thereof being capable of being knocked out as shown at 82 in Fig. 1. When this portion is knocked out to form an opening 82 in the cover 42, the pin 81 of the manual reset lever 76 is placed in the hole 80 of the lever 54 so that the reset lever 76 will extend upwardly and outwardly through the opening 82 so that the lever 54 may be manually shifted in a clockwise direction.

To prevent movement of the lever 54 in a clockwise direction by the pin 71, the projection 58 is notched half way through as at 83 so that the projection may be broken off. Fig. 5 shows the lever 54 and its associated parts assembled for manual resetting of the mechanism while the lever 54 and its associated parts are shown for the automatic operation of the device in Fig. 3.

For the operation of the semi-automatic device, assume that the liquid level is at its maximum height in the float chamber 10, carrying with it the float 18 and that the switch 72 and the lever 54 are in their furthest clockwise position. As the level of the liquid falls in the float chamber 10, the float 18 drops about its pivots 26 and the pin 71 engages the upper projection 57 to move the lever 54 and its associated mercury tube switch 72 in a counterclockwise direction and when it is sufficiently so moved, the mercury flows from the right hand end of the tube to the left hand end of the tube to complete a switching operation. Now, as the liquid level rises, the float 18 rises but since the lug 58 is broken off from the lever 54, the pin 71 cannot move the lever 54 and its associated switch 72 in a clockwise direction. Clockwise movement is then manually given to the lever 54 and its associated switch 72 by the manual reset lever 76.

From the above, it is seen that I have invented a control mechanism having a lost motion therein which takes care of vibrations of the actuating element, that I have invented a control mechanism that is entirely automatic in its operation and by simple changes may be made semi-automatic in its operation.

While one embodiment of this invention has been shown and described, it is obvious that many modifications may be apparent to one skilled in the art and consequently this invention is to be limited only by the scope of the appended claims.

I claim:—

1. In a control mechanism of the class described, a float chamber, a float in said chamber adapted to be raised and lowered by liquid level changes in said chamber, a rod connected to said float and extending out of said chamber, a bellows connected to said rod and to said chamber to seal said chamber, a pivot arm secured to said rod and pivoted to the exterior of said casing, a pin extending from said pivot arm, a supporting member secured to said casing, a lever pivoted on said supporting member, a mercury tube switch carried by said lever, laterally extending spaced projections on said lever, said pin projecting between said projections to form a lost motion connection between said projections and said pin whereby upward movement of said float causes said pin to engage one of said projections to shift said switch in one direction and downward movement of said float causes said pin to engage the other of said projections to shift said switch in another direction, a friction device between said supporting member and said lever to maintain said lever in said shifted positions, a cover enclosing said pivoted arm, lever, switch, supporting member and friction device, means facilitating removal of one of said projections from said lever whereby movement of said float in one direction does not shift said switch in one direction, means facilitating removal of a portion of said cover to form an opening therein, and a manual reset lever adjustably mounted on said lever to extend through said opening to provide manual means for shifting said lever to shift said switch in said one direction.

2. In a control mechanism of the class described, a float chamber, a float in said chamber adapted to be raised and lowered by liquid level changes in said chamber, a rod connected to said float and extending out of said chamber, a bellows connected to said rod and to said chamber to seal said chamber, a pivot arm secured to said rod and pivoted to the exterior of said casing, a pin extending from said pivot arm, a supporting member secured to said casing, a lever pivoted on said supporting member, a mercury tube switch carried by said lever, laterally extending spaced projections on said lever, said pin projecting between said projections to form a lost motion between said projections and said pin whereby upward movement of said float causes said pin to engage one of said projections to shift said switch in one direction and downward movement of said float causes said pin to engage the other of said projections to shift said switch in another direction, a cover enclosing said pivoted arm, lever, switch and supporting member, means facilitating removal of one of said projections from said lever whereby movement of said float in one direction does not shift said switch in one direction, means facilitating removal of a portion of said cover to form an opening therein, and a manual reset lever adjustably mounted on said lever to extend through said opening to provide manual means for shifting said lever to shift said switch in said one direction.

3. In a control mechanism of the class described, a float chamber, a float in said chamber adapted to be raised and lowered in said chamber by liquid level changes in said chamber, a rod connected to said float and extending out of said chamber, a bellows connected to said rod and to said chamber to seal said chamber, an arm secured to said rod and pivoted outside of said chamber and said bellows, an element to be shifted, a lost motion connection between said pivoted arm and said element whereby said element is shifted by said float, and a friction means associated with said element to maintain said element in any of its shifted positions while said pivoted arm is taking up the lost motion provided by the lost motion connection.

4. In a control mechanism of the class described, a float chamber, a float in said chamber adapted to be raised and lowered in said chamber by liquid level changes in said chamber, a rod connected to said float and extending out of said chamber, a bellows connected to said rod and to said chamber to seal said chamber, an arm secured to said rod and pivoted outside of said chamber and said bellows, an element to be shifted, a lost motion connection between said pivoted arm and said element whereby said element is shifted in both directions by said float, means facilitating removal of a portion of said lost motion connection whereby said element is moved in one direction only by said float, manual means to shift said element in the other direction, and means associated with said element to maintain said element in its shifted positions.

5. In a control mechanism of the class described, a float chamber, a float in said chamber adapted to be raised and lowered in said chamber by liquid in said chamber, a rod connected to said float and extending out of said chamber, a bellows connected to said rod and to said chamber to seal said chamber, a pivoted arm secured to said rod, an element to be shifted, a lost motion connection between said pivoted arm and said element whereby said element is shifted in both directions by said float, means facilitating removal of a portion of said lost motion connection whereby said element is moved in one direction only by said float, and manual means to shift said element in the other direction.

6. In a device of the character described, a pivoted arm, means to move said arm about its pivot, a supporting member, a lever pivoted on said supporting member, a mercury tube switch carried by said lever, laterally extending spaced projections on said lever, a pin of less diameter than the distance between said spaced projections on said pivoted arm projecting between said projections to form a lost motion connection between said pin and said projections whereby said lever is oscillated to make and break said switch by movement of said pivoted arm and a friction device between said supporting member and said lever to maintain said lever and said switch in said shifted positions.

7. In a device of the character described, a pivoted arm, means to move said arm about its pivot, a supporting member, a lever pivoted to said supporting member, a mercury tube switch carried by said lever, spaced projections on said lever, a pin on said pivoted arm projecting between said projections to form a lost motion between said projections and said pin whereby movement of said pin causes said pin to engage one of said projections to shift said switch in one direction and to engage the other of said projections to shift said switch in the other direction, a friction device between said supporting member and said lever to maintain said lever and said switch in their shifted positions, means to facilitate removal of one of said projections from said lever whereby movement of said pin does not move said switch in one direction, and a manual reset lever mounted on said lever to provide manual means for shifting said lever to shift said switch in said one direction.

8. In a device of the character described, a pivoted arm, means to move said arm about its pivot, a supporting member, a lever pivoted to said supporting member, a mercury tube switch carried by said lever, spaced projections on said lever, a pin on said pivoted arm projecting between said projections to form a lost motion between said projections and said pin whereby movement of said pin causes said pin to engage one of said projections to shift said switch in one direction and to engage the other of said projections to shift said switch in the other direction, means to facilitate removal of one of said projections from said lever whereby movement of said pin does not move said switch in one direction, and a manual reset lever mounted on said lever to provide manual means for shifting said lever to shift said switch in said one direction.

9. In a device of the character described, a pivoted arm, means to move said arm about its pivot, an element to be shifted, a lost motion connection between said element and said pivoted arm whereby said element is shifted in both directions, means to facilitate removal of a portion of said lost motion connection whereby said element is shifted in one direction only by said pivoted arm, manual means to shift said element in the other direction and means associated with said element to maintain said element in its shifted positions.

10. In a control mechanism of the class described, a chamber adapted to contain liquid of a varying level, a shiftable member which is shifted in response to changes in the liquid level in said chamber, a control element, connections between said shiftable member and control element including a lost motion connection, and means operative, while said shiftable member is taking up the lost motion provided by the lost motion connection, to maintain said control element in any position to which it is moved by said shiftable member whereby surges in the liquid level in said chamber are not transmitted to said control element.

11. In a control mechanism of the character described, a float chamber, a float in said chamber adapted to be raised and lowered by liquid level changes in said chamber, a float rod connected to said float and extending out of said chamber, a bellows connected to said rod and to said chamber to seal said chamber and means for pivoting said float rod exteriorly of said casing at a point intermediate the ends and exteriorly of said bellows whereby resistance offered by said bellows to the movement of said float is materially reduced.

12. A device of the class described, comprising in combination, a float chamber, a float in said chamber adapted to be raised and lowered in said chamber by liquid in said chamber, a rod connected to said float and extending out of said chamber, bellows means connected to said rod and said chamber to seal said liquid in said chamber, an arm pivotally secured to said rod, an element to be shifted, a lost motion connection between said arm and said element whereby said element is shifted in both directions by said float, said lost motion connection comprising a pair of spaced projections carried by said element and a pin of a diameter less than the distance between said projections carried by said rod, means facilitating removal of one of said projections, said means comprising a notch in one of said projections whereby said one of said projections may be readily removed from said element whereby said element is moved in one direction only by said float, and manual means to shift said element in the other direction.

13. A device of the class described, comprising in combination, a float chamber, a float in said chamber adapted to be raised and lowered in said chamber by liquid in said chamber, a rod connected to said float and extending out of said chamber, bellows means connected to said rod and said chamber to seal said liquid in said chamber, an arm pivotally secured to said rod, an element to be shifted, a lost motion connection between said arm and said element whereby said element is shifted in both directions by said float, said lost motion connection comprising a pair of spaced projections carried by said element and a pin of a diameter less than the distance between said projections carried by said rod, means facilitating removal of one of said projections, said means comprising a notch therein whereby one of said projections may be readily removed from said element whereby said element is moved in one direction only by said float, manual means to shift said element in the other direction, said manual means comprising a lever pivotally mounted on said element whereby when one of said projections is removed said lever may be rotated about its pivot to an extended position whereby it may be readily grasped, and means to secure said lever in said extended position.

14. Switch means comprising, in combination, an element having a pair of spaced projections thereon, a support for said element, a mercury switch carried by said element, a pivot securing said element and said mercury switch to said support, an actuating member to tilt said mercury switch, said member comprising a pin extending between said projections and of a diameter less than the distance between said projections whereby to form a lost motion connection between said actuating member and said first mentioned element, means facilitating removal of one of said projections whereby said lost motion connection may be readily transformed to a one-way connection and manual means to move said element and hence said mercury switch in the other direction.

15. Switch means comprising, in combination, an element having a pair of spaced projections thereon, a support for said element, a mercury switch carried by said element, a pivot securing said element and said mercury switch to said support, an actuating member to tilt said mercury switch, said member comprising a pin extending between said projections and of a diameter less than the distance between said projections whereby to form a lost motion connection between said actuating element and said first mentioned element, means facilitating removal of one of said projections whereby said lost motion connection may be readily transformed to a one-way connection and manual means to move said element and hence said mercury switch in the other direction, said manual means comprising a lever pivotally mounted upon said element and having a projection adapted to engage an aperture in said element whereby when said lever is rotated about its pivot to extended position, said projection and aperture connection holds the same securely against displacement.

CARL G. KRONMILLER.